United States Patent [19]

Koide

[11] 4,450,487
[45] May 22, 1984

[54] TELEVISON CAMERA AND REMOTE-CONTROLLABLE VIDEO SIGNAL RECORDING/REPRODUCING APPARATUS

[75] Inventor: Hajime Koide, Ichikawa, Japan

[73] Assignee: Victor Company of Japan, Limited, Yokohama, Japan

[21] Appl. No.: 319,103

[22] Filed: Nov. 6, 1981

[30] Foreign Application Priority Data

Nov. 7, 1980 [JP] Japan ............................ 55-159379[U]
Nov. 7, 1980 [JP] Japan ............................ 55-159380[U]

[51] Int. Cl.³ .............................................. A04N 5/76
[52] U.S. Cl. .................................. 358/335; 358/906; 358/210; 360/33.1
[58] Field of Search ...................... 358/335, 906, 194.1, 358/185, 210; 360/33.1; 369/24

[56] References Cited

U.S. PATENT DOCUMENTS

| | | | |
|---|---|---|---|
| 3,984,625 | 10/1976 | Camras | 358/906 |
| 4,334,242 | 6/1982 | Mangold | 358/335 |
| 4,368,490 | 1/1983 | Takimoto | 358/335 |

FOREIGN PATENT DOCUMENTS

| | | | |
|---|---|---|---|
| 551321 | 11/1956 | Italy | 358/194.1 |
| 52-14314 | 2/1977 | Japan | 358/335 |
| 56-14781 | 2/1981 | Japan | 358/335 |

*Primary Examiner*—Alan Faber
*Attorney, Agent, or Firm*—Lowe, King, Price & Becker

[57] ABSTRACT

A remote-control unit for producing operating mode-control signals of a video signal recording/reproducing apparatus is detachably attached to the body of a television camera. The output signals of the remote-control unit are fed via wires included in the camera body to some wires of a television camera cable which is connected to the recording/reproducing apparatus when using the camera. The output signals of the remote-control unit may be applied via its cable or via conductors attached to the housing of the unit to the camera. A wireless remote-control unit arranged to emit light rays may be attached to the camera body so that the light rays are received by a photosensitive element provided to the camera. In order that the remote-control unit may be used together with and independently of the camera, the pins of a remote-control unit cable jack of the recording/reproducing apparatus are connected to some pins of a camera cable jack of the apparatus. A remote-control device may be built in the camera body when detachability is unnecessary.

4 Claims, 5 Drawing Figures

TELEVISON CAMERA AND REMOTE-CONTROLLABLE VIDEO SIGNAL RECORDING/REPRODUCING APPARATUS

BACKGROUND OF THE INVENTION

This invention generally relates to television or video cameras and remote-controllable video signal recording/reproducing apparatus, such as a video tape recorder (VTR) or the like, and more particularly the present invention relates to remote-control systems between a television camera and a video signal recording/reproducing apparatus.

Conventional television cameras, which are used together with a recording/reproducing apparatus, such as a VTR or the like, are equipped with a start/stop button for driving and stopping the magnetic recording tape in the recording mode so that unnecessary images are prevented from being recorded on the magnetic tape.

Some conventional television cameras are equipped with an electronic view finder through which not only the shooting images but also prerecorded images reproduced from the VTR can be seen. However, in the case of monitoring by means of such an electronic view finder mounted on or built in the camera, it is impossible to change the operating modes of the VTR, such as rewinding, fast forwarding etc. from the television camera side. Therefore, it is necessary to directly manipulate the VTR to set the same in a desired operating mode. Although the VTR may be manipulated to select a desired mode if the shooter carries both the television camera and the VTR, in the case that the VTR is placed apart from the shooter, the shooter must carry a remote-control unit electrically connected to the VTR together with the television camera. It is troublesome to manipulate both the television camera and the remote-control unit by gripping the camera in one hand and the remote-control unit in the other hand. Furthermore, it is desirable to use both hands to hold and manipulate the television camera so as to stably hold the camera to obtain stable images. In addition, the use of the conventional remote-control unit together with a television camera requires at least two cables leading to the VTR; one for the camera, and the other from the remote-control unit. When the cables are relatively long, the cables are apt to become entangled and are apt to become obstacles to the operation of the camera. Namely, the conventional television cameras are not satisfactory in operativity especially in the case of controlling the VTR in various modes even if a remote-control unit is used.

SUMMARY OF THE INVENTION

The present invention has been developed in order to remove the above-mentioned drawbacks and disadvantages inherent to the conventional remote-control systems for a video signal recording/reproducing apparatus.

It is, therefore, an object of the present invention to provide a remote-control system for a video signal recording/reproducing apparatus so that the video signal recording/reproducing apparatus may be put in a desired operating mode by manipulating a remote-control unit detachably attached to or built in a television camera, where the output remote-control signals from the remote-control unit are fed via wires included in the camera cable connected to the video signal recording/reproducing apparatus.

According to a feature of the present invention, the remote-control unit may be stably received in recess or pocket made in the outer surface of a television camera so that there is no need to hold the remote-control unit when gripping the camera to effect shooting.

According to another feature of the present invention, the remote-control unit may function as a conventional remote-control unit when detached from the television camera.

According to another feature of the present invention, the cable of the remote-control unit may be changed so that a short cable may be used when connected to the television camera and a longer cable may be used when connected to the video signal recording/reproducing apparatus.

According to another feature of the present invention, the recording/reproducing apparatus, such as a VTR, a video disk recorder or the like, can be remote-controlled from a television camera side so that reproduced pictures from the VTR or the like can be seen or monitored in an electronic view finder mounted on or built in the camera without directly manipulating the VTR.

According to a further feature of the present invention, a wireless remote-control unit may be attached to the television camera, while the wireless remote-control unit may be used as a conventional remote-control unit when detached from the camera.

According to a still further feature of the present invention, the pins of a remote-control unit cable jack of a video signal recording/reproducing apparatus are connected via wires to some pins of a camera cable jack of the same so that the detachable remote-control unit may be used either together with or independently of the camera.

In accordance with the present invention, there is provided a television camera for producing an output electrical signal indicative of images of a subject, comprising: (a) a body; (b) a lens system attached to said body; (c) a photosensitive element held in said body and being responsive to light rays from said lens system for producing a video signal; (d) a camera cable for transmitting the output signal of said television camera, said camera cable having a plurality of wires; (e) first means for holding a remote-control unit so that said remote-control unit is detachably attached to said body; (f) second means for receiving the output signals from said remote-control unit; and (g) third means for transmitting said output signals received by said second means to said camera cable so that said output signals of said remote-control unit can be fed via some of said wires of said camera cable to an associated device.

In accordance with the present invention, there is also provided a television camera for producing an output electrical signal indicative of images of a subject, comprising: (a) a body; (b) a lens system attached to said body; (c) a photosensitive element held in said body and being responsive to light rays from said lens system for producing a video signal; (d) a camera cable for transmitting the output signal of said television camera, said camera cable having a plurality of wires; (e) remote-control means for producing various remote-control signals, said remote-control means having a plurality of buttons corresponding to various modes of a video signal recording/reproducing apparatus which records the output signal of said television camera, said remote-control means being capable of producing various control signals for controlling the operation of said video signal recording/reproducing apparatus, said buttons being attached to said body; and (f) means for transmitting said control signals from said remote control means to said camera cable so that said control signals can be fed via some of said wires of said camera cable to said video signal recording/reproducing apparatus.

In accordance with the present invention there is also provided a video signal recording/reproducing apparatus, comprising: (a) first means for driving a recording medium; (b) second means for processing an input signal to record the same on said recording medium; (c) third means for receiving signals from a television camera, said third means having a plurality of conductors respectively contactable with a plurality of wires included in a television camera cable, some of said conductors being connected to said second means for feeding said second means with an output video signal of said television camera; (d) fourth means for receiving signals from a remote-control unit, said fourth means having a plurality of conductors connected to said first means for controlling the operation of said video signal recording/reproducing apparatus in response to remote-control signals from said remote-control unit; and (e) fifth means having a plurality of conductors connected between said conductors of said fourth means and some of said conductors of said third means so that remote control signals fed via said television camera cable are fed to said first means.

In accordance with the present invention there is further provided a remote-control system for a video signal recording/reproducing apparatus having a camera cable terminal which can be connected to a connector of a television camera cable, comprising: (a) a remote-control unit having various buttons corresponding to various modes of said video signal recording/reproducing apparatus, said remote-control unit being capable of producing various control signals for controlling the operation of said video signal recording/reproducing apparatus; (b) a cable connected to said remote-control unit and having a connector at the end thereof; (c) a jack attached to a television camera, said jack being engageable with said connector; and (d) wires connected between said jack and said television camera cable, said television camera cable having wires for feeding said video signal recording/reproducing apparatus with said various control signals.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like numerals throughout the drawings.

DETAILED DESCRIPTION OF THE INVENTION

Figure 1:
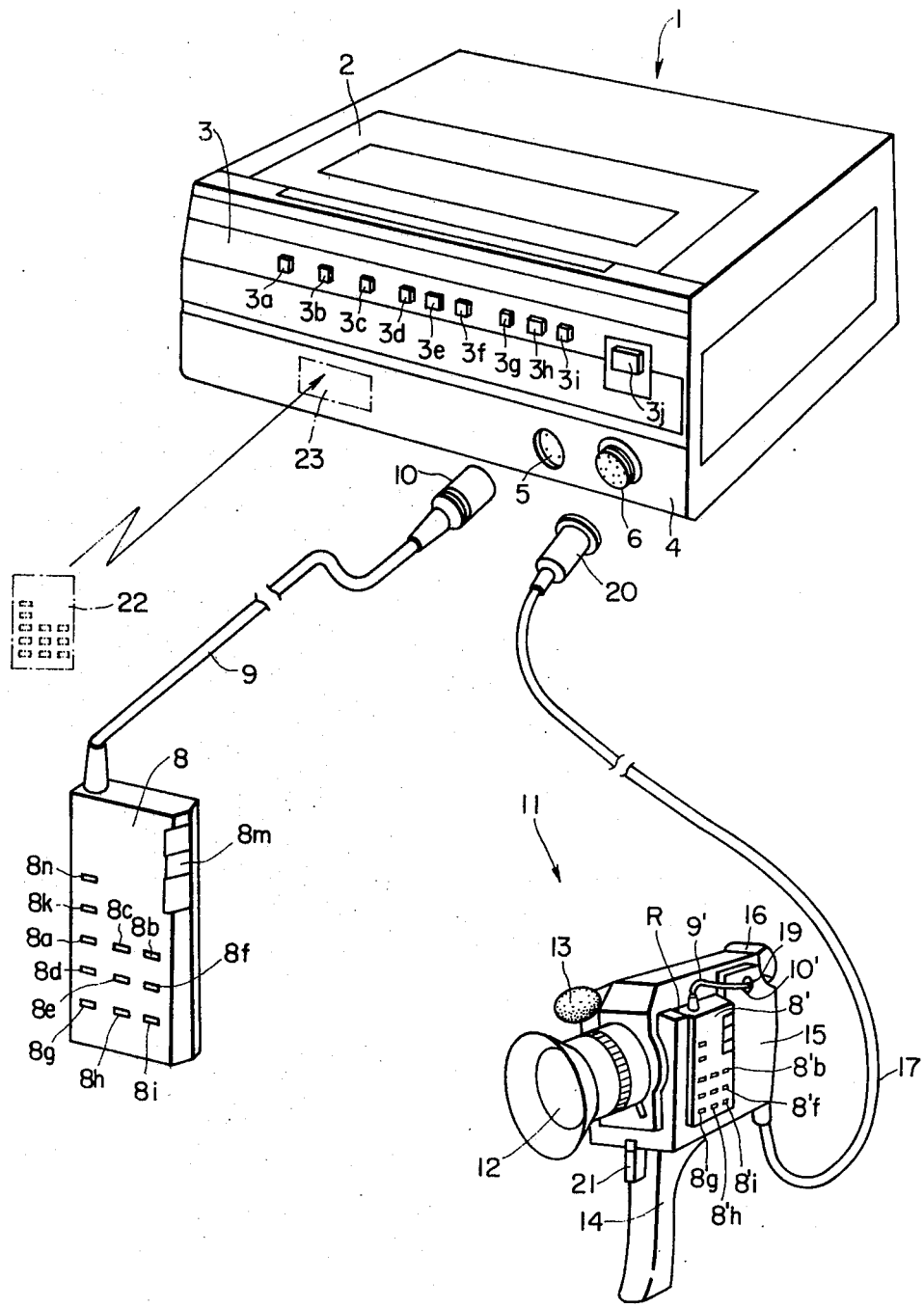
FIG. 1 is a schematic perspective view of an embodiment of the remote-control system for a video signal recording/reproducing apparatus, according to the present invention.

Referring now to FIG. 1, a schematic perspective view of an embodiment of the present invention is shown. The perspective view shows a portable video tape recorder (VTR), a television camera and various remote-control units. The reference numeral 1 generally designates the VTR which is the objective of remote control to be effected. A cassette housing 2, which is a cassette tape-inserting portion having a popup mechanism, is formed on the upper surface of the VTR housing, while a manipulation portion 3 and a connector portion 4 are formed on the front surface thereof.

The reference numeral 3a is a pause (still) button; 3b, an after-recording button for audio signals; 3c, a record button; 3d, a reverse high-speed reproduce button; 3e, a normal reproduce button; 3f, a forward high-speed reproduce button; 3g, a rewind button; 3h, a stop button, 3i, fast forward button; and 3j, an eject button.

The VTR 1 comprises a jack 6 or a terminal which is engageable with a connector or plug 20 of a television camera cable 17. The jack 6 has a plurality of pins or conductors which are connectable with conductors of the connector 20, where the latter conductors are respectively connected to wires included in the television camera cable 17. The VTR 1 further comprises another jack 5 which is engageable with a plug 10 of a remote-control unit cable 9 connected to a remote-control unit 8 at the other end.

The remote-control unit 8, which is substantially the same in construction as a conventional one, comprises various keys or buttons 8a through 8i for selecting a desired operating mode of the VTR 1, and a remote-control signal generating circuit (not shown) responsive to the operation of the keys thereof. In addition, the remote-control unit 8 has the above-mentioned remote-control unit cable 9. The buttons 8a through 8i attached to the manipulation portion 3 of the remote-control unit 8 have the same functions as the above-mentioned buttons 3a through 3i of the VTR 1. The remote-control unit 8 further comprises a frame-feeding button 8k for variable speed reproduction, a slow-motion reproduction button 8n, and a slide knob 8m for changing the speed reduction ratio in slow-motion reproduction.

The VTR 1 is shown to further comprise a photosensitive device 23 which is provided for receiving light rays emitted from a wireless remote-control unit 22. The wireless remote-control unit 22 is arranged to emit various light rays indicative of a selected operating mode of the VTR 1. The photosensitive device 23 generates a given output signal in accordance with the received light ray. In the embodiment of FIG. 1, although both the wired remote-control unit 8 and the wireless remote-control unit 22 can be used, the wireless remote-control unit 22 may be omitted if unnecessary. For this reason, the wireless remote-control unit 22 and the photosensitive device 23 are both shown by way of dot-dash lines.

A television camera, which is generally designated at a reference 11 comprises a body 15 in which a photosensitive element, such as a camera tube 30 (see FIG. 2) is provided. A lens system 12 is attached to the body 15 so that light rays from a subject applied to the lens system 12 is directed to the photosensitive element 30, generating a video signal indicative of the images of the subject. The television camera 11 further comprises a microphone 13, an electronic view finder 32 (see FIG. 2), an eyepiece 16 attached to the electronic view finder 32, a hand grip 14, a start/stop switch or button 21 and the above-mentioned television camera cable 17 in the same manner as a conventional one.

The body 15 of the television camera 11 has a rectangular recess R or pocket for partially receiving and holding a remote-control unit 8', which may be identical with the above-mentioned remote-control unit 8. A jack 19 is provided to the television camera body 15 so as to receive electrical control signals from the remote-control unit 8'. The remote-control unit 8' has various buttons 8'a through 8'a, 8'k, 8'm and 8'n having the same functions with those buttons 8a through 8i, 8k, 8m and 8n of the remote-control unit 8. Namely, the remote-control unit 8' has a remote-control signal generating circuit for producing various control signals causing various operating modes of the VTR 1 in response to signals from the buttons thereof.

Figure 2:
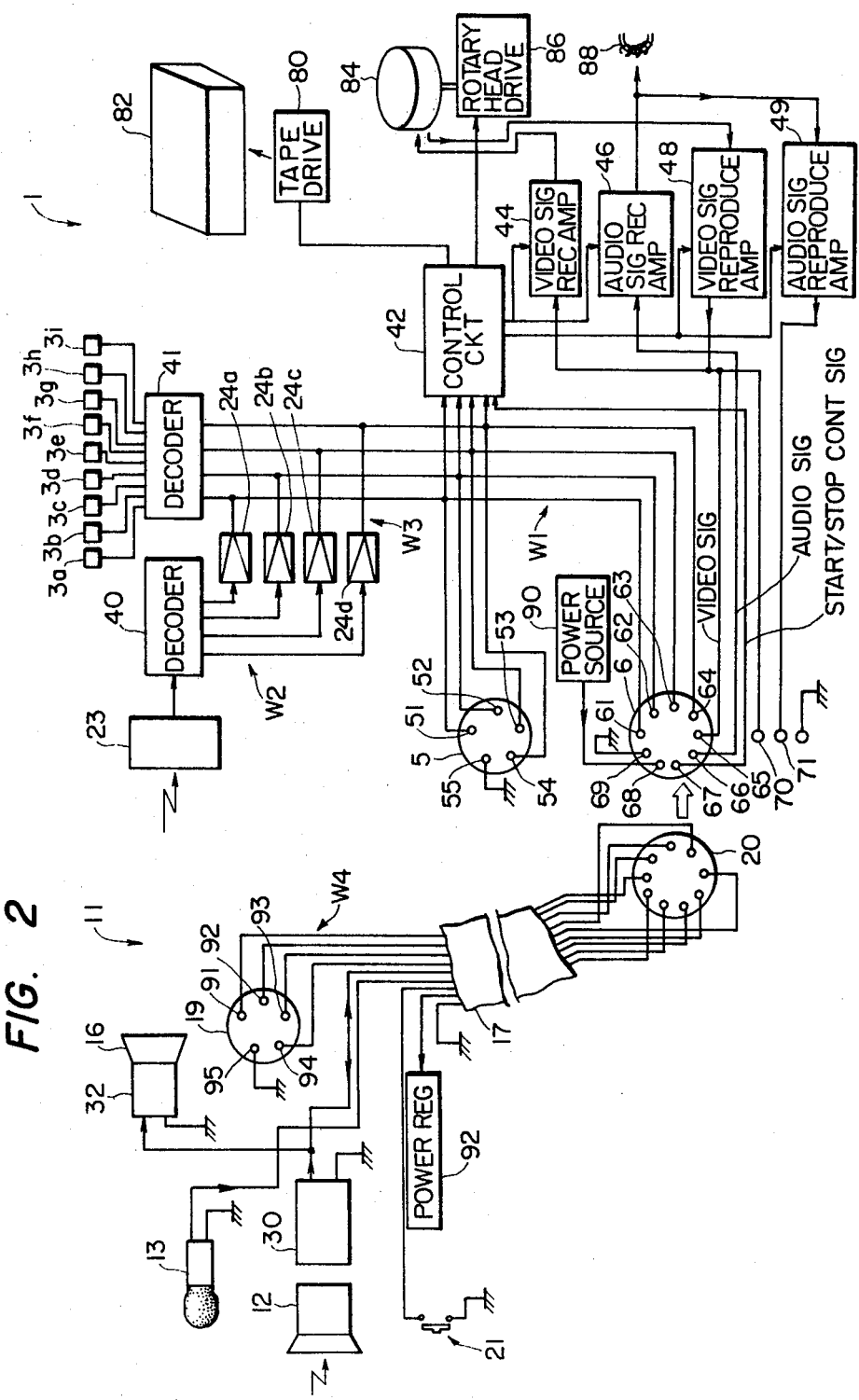
FIG. 2 is a schematic circuit diagram showing electrical connections between various parts shown in FIG. 1.

FIG. 2 illustrates a schematic circuit diagram of the remote-control system of FIG. 1. The left part of FIG. 2 shows the circuit of the television camera 11, while the right part thereof shows the circuit of the VTR 1. The output terminal of the photosensitive device 30 and the output terminal of the microphone 13 are respectively connected to wires of the television camera cable 17. A terminal of the start/stop switch 21 is also connected to a wire of the cable 17. Inside the television camera 11, the output terminal of the photosensitive device 30 is connected to the electronic view finder 32 for feeding the same with a video signal. The jack 19 attached to the body 15 of the camera 11 has five pins P91 to P95 or conductors respectively connected via lead wires W4 to the wires of the camera cable 17. A power regulator 92 is provided inside the camera 11 for feeding various circuits with regulated power voltages, and is arranged to receive power via a wire included in the cable 17 from the VTR 1. Although the wires of the cable 17 are shown to be directly connected to various elements in the television camera 11, a jack may be provided so that the cable 17 can be detected from the camera 11 when unused. Such a detachable camera cable is advantageous because the cable 17 can be replaced with a shorter or longer one when necessary.

In the right part of FIG. 2, the photosensitive device 23 for receiving light rays from the above-mentioned wireless remote-control unit 22 has an output terminal connected to an input terminal of a decoder 40 which produces one or more output signals by decoding the information included in the received light. The decoder 40 has four output terminals respectively connected via lead wires W2 to four amplifiers 24a, 24b, 24c and 24d whose output terminals are respectively connected via lead wires W3 to four pins P51 through P54 of the remote-control unit cable jack 5. The jack 5 has five pins P51 through P55, among which the pin P55 is grounded. The other jack 6 for receiving signals from the television camera 11 has nine pins P61 through P69 or conductors. Four pins P61 through P64 among the nine pins P61 through P69 are respectively connected via lead wires W1 to the four pins P51 to P54 of the remote-control unit cable jack 5; a video signal pin P65 is connected to a video signal recording amplifier 44 including a video signal processing circuit (not shown) and to a video signal reproducing amplifier 48 including another video signal processing circuit (not shown); an audio signal pin P66 is connected to an audio signal recording amplifier 46; a start/stop control signal pin P67 is connected to a control circuit 42; a power supply pin P68 is connected to a power source 90; and a ground pin P69 is grounded.

In FIG. 2, although it is shown that remote control is effected by means of four lead wires, the number of the lead wires may be increased or decreased if necessary depending on the number of operating modes to be performed, and the number of pins of each connector and jack may be changed accordingly. Furtheremore, although the jack 6 of the VTR 1 is shown to have only nine pins P61 to P69, the number of the pins and therefore, the number of wires included in the camera cable 17 may be increased if necessary.

The four pins P51 through P54 of the remote-control unit cable jack 5 are connected to the control circuit 42 which is also responsive to four signals from a second decoder 41 connected to the above-mentioned various function keys 3a through 3i of the VTR 1. The control circuit 42 is of conventional one, and is arranged to produce various control signals for controlling the operation of a tape driving mechanism 80 which drives the magnetic tape of a cassette tape 82. The control circuit 42 produces other control signals respectively fed to a rotary-head driving mechanism 86 and to video and audio signal recording amplifiers 44 and 46 and to video and audio signal reproducing amplifiers 48 and 49. The output terminal of the video signal recording amplifier 44 is connected to the rotary head 84 which is also connected to the input terminal of the video signal reproducing amplifier 48. The output terminal of the audio signal recording amplifier 46 and the input terminal of the audio signal reproducing amplifier 49 are connected to an audio signal recording/reproducing head 88. The output terminals of the video and audio signal reproducing amplifiers 48 and 49 are respectively connected to output terminals 70 and 71 of the VTR 1 so that reproduced video and audio signals can be fed to an external device, such as a monitor television (not shown).

The remote-control system of FIGS. 1 and 2 operates as follows: When it is intended to use the remote-control unit 8 in same manner as in the conventional remote-control system, the remote-control unit 8 may b directly connected to the VTR 1, by engaging the plug 10 at the end of the remote-control unit cable 9 with the jack 5. In this case, it is preferable to use a relatively long cable as the remote-control unit cable 9 so that the user or operator can control the VTR 1 from a position remote from the VTR 1. When it is intended to record video and audio signals captured by the television camera 11, the remote-control unit 8 or the exclusive remote-control unit 8' may be attached to the body 15 of the camera 11 as shown in FIG. 1. The exclusive remote-control unit 8' is designed to be used only with the television camera 11, and therefore, it has a short cable 9'. In the case of attaching the remote-control unit 8, the cable 9 thereof, which is relatively long is preferably changed with a shorter one, such as the cable 9' of the remote-control unit 8', so that the cable 9' does not become an obstacle to the operation of the camera 11.

The short cable 9' has a plug 10', which is the same in construction as the plug 10, and this plug 10' is engaged with the jack 19 provided to the body 15 of the camera 11. As a result of this connection, the output signals from the remote-control unit 8' are fed via the lead wires W4 of FIG. 2 to the wires included in the television camera cable 17. Since the plug 20 of the television camera cable 17 is engaged with the jack 6 of the VTR 1 when using the camera 11, the remote-control unit 8' attached to the camera body 15 is capable of functioning in the same manner as the remote control unit 8 directly connected to the VTR 1 through the jack 5. Therefore, the VTR 1 can be controlled by the remote-control unit 8' attached to the camera body 15 so that various modes of the VTR 1 can be actualized. Furthermore, when it is intended to see prerecorded images through an electronic view finder mounted on or built in the camera 11 as in this embodiment, by putting the VTR 1 in the reproduce mode, there is no need to directly manipulate the VTR 1. Namely, in the reproduce mode, video signal reproduced from the magnetic tape 82 is fed via the video signal recording amplifier 48 to the electronic view finder 32 through the television camera cable 17.

In order to monitor the prerecorded pictures by the electronic view finder 32 of the camera 11, the rewind button 8'g of the remote-control unit 8' is manipulated after recording has been made. At this time, if the reverse high-speed reproduce button 8'd (or both the reproduce button 8'e and the reverse high-speed reproduce button 8'd) is manipulated, the electronic view finder 32 functions as a monitor TV providing high-speed reverse reproduction pictures through the eyepiece 16 thereof.

Furthermore, if the reproduct button 8'e is manipulated, normal reproduction pictures can be obtained at the electronic view finder 32, and therefore, it is possible to operate the television camera 11 in such a manner that new images can be recorded from a point of unnecessary old recording (without manipulating the manipulation buttons of the VTR 1 each time of such an operation).

Although it has been described that the remote-control unit 8' is attached to the body 15 of the camera 11, the remote-control unit 8' may be used without being attached to the camera body 15 if desired. In this case, the remote-control unit 8' detached from th camera body 15 may be placed at a position in which it can be readily manipulated when the shooter peeps into the eyepiece 16 of the electronic view finder 32 with the cable 9' connected to the jack 19 of the camera 11.

Figure 3:
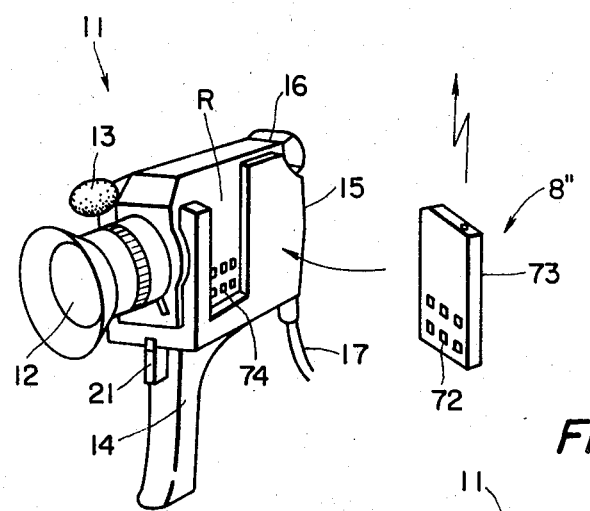
FIG. 3 is a schematic perspective view of another embodiment of the remote-control system in which electrical connection between a remote-control unit and a television camera is effected by conductors respectively attached to the remote-control unit and to the camera body.
Figure 4:
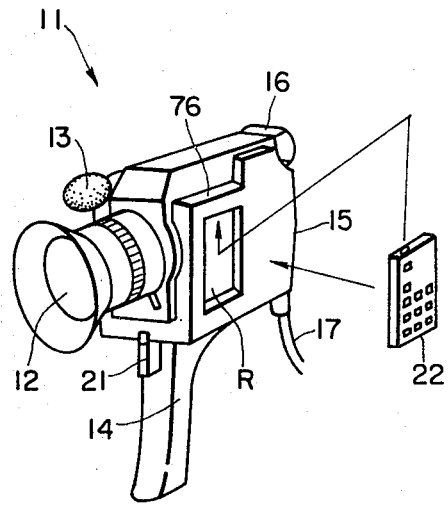
FIG. 4 is a schematic perspective view of another embodiment of the remote-control system in which the output signals from a remote-control unit are optically transmitted to a television camera.
Figure 5:
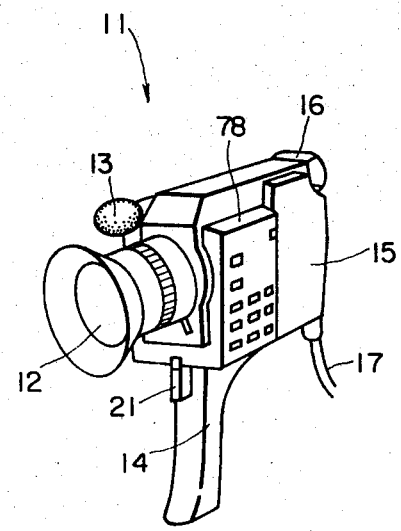
FIG. 5 is a schematic perspective view of another embodiment of the remote-control system which is actualized by a television camera equipped with a remote-control device built in the body of the camera.

FIGS. 3 through 5 respectively show different embodiments of the present invention. In the above-described embodiment of FIG.1, although the remote-control unit 8' is electrically connected via the cable 9' to the jack 19 of the camera 11, other ways for transmitting the output signals of the remote-control unit may be employed as will be described hereinbelow.

In th embodiment of FIG. 3, the remote-control unit 8" comprises a plurality of conductors 72 at the rear of the housing 73 thereof, while a plurality of conductors 74 are placed on the surface of the camera body 15. These conductors 72 and 74 of the remote-control unit 8" and the body 15 are arranged so that they respectively contact each other when the remote-control unit 8" is received in the recess R. Since the output signals from the remote-control unit 8" are fed through the conductors 72 and 74 to the wires of the television camera cable 17, no cable for making electrical connections between the remote-control unit 8" and the camera 11 is needed. The remote-control unit 8" may be arranged to emit light rays in the same manner as the wireless remote-control unit 22 of FIG. 1, so that the remote-control unit 8" may be used as a conventional one when detached from the camera body 15. However, when it is desired to use the remote-control unit 8" as a wired remote-control unit, a jack for connecting a cable such as the cable 9 of FIG. 1 may be provided.

In the embodiment of FIG. 4, the wireless remote-control unit 22 of FIG. 1 is attached to the camera body 15. The camera 11 comprises a photosensitive device 76 similar to the above-mentioned photosensitive device 23 of the VTR 1 so as to receive the optical information or instructions emitted from the wireless remote-control unit 22.

In the embodiment of FIG. 5, a remote-control device 78 is incorporated with the camera 11. Namely, a plurality of function keys or buttons similar to those in previous embodiments are attached to the camera body 15, and a remote-control signal generating circuit is built in the camera body 15.

As described in the above, in the television camera according to the present invention, since a remote-control unit for a video signal recording/reproducing apparatus is provided, the video signal recording/reproducing apparatus may be operated by remote control with the television camera put in shooting condition, so as to obtain various reproduce pictures of high-speed reverse reproduction, high-speed forward reproduction, normal reproduction and the like by the electronic view finder, and thus the operativity can be improved.

From the foregoing description, it will be understood that the television camera cable functions not only the conventional camera cable for supplying the VTR with the output signals of the camera but also a cable for supplying the remote-control signals from the remote-control unit or device which may be detachably attached to or built in the television camera body 15. As a result, the television camera is easy to handle in the case of performing remote control compared to the troublesome manipulation of the conventional separate remote-control unit which is independently connected to the VTR.

Although the embodiments of the present invention have been described in connection with a remote-control system for a VTR, the remote-control system may be adapted to a video disk recorder or the like which records video signals from a television camera. The above-described embodiments are just examples of the present invention, and therefore, it will be apparent for those skilled in the art that many modifications and variations may be made without departing from the spirit of the present invention.

What is claimed is:
1. A television camera for producing an output electrical signal indicative of images of a subject, the camera comprising:
 (a) a body;
 (b) a lens system attached to said body;
 (c) a photosensitive element held in said body and being responsive to light rays from said lens system for producing a video signal;
 (d) a camera cable for transmitting the output signal of said television camera, said camera cable having a plurality of wires;

(e) first means for holding a wireless remote-control unit so that said remote-control unit is detachably attached to said body, the remote control unit being of a type that emits light rays as output signals;
(f) second means for receiving the output signals from said remote-control unit, said second means including a photosensitive device responsive to the light rays emitted from said wireless remote-control unit; and
(g) third means for transmitting said output signals received by said second means to said camera cable so that said output signals of said remote-control unit can be fed via some of said wires of said camera cable to an associated device.

2. A video tape recording/reproducing system comprising:
(a) a television camera for producing an output electrical signal indicative of images of a subject, the camera including:
a body;
a lens system attached to said body;
a photosensitive element held in said body and being responsive to light rays from said lens system for producing a video signal;
a camera cable for transmitting the output signal of said television camera, said camera cable having a plurality of wires;
first means for holding a remote-control unit so that said remote-control unit is detachably attached to said body;
second means for receiving remote-control signals from said remote-control unit; and
third means for transmitting said remote-control signals received by said second means to said camera cable;
and
(b) a video tape recording/reproducing apparatus, including:
fourth means for driving a recording medium;
fifth means for processing an input signal to record the same on said recording medium;
sixth means for receiving signals from said television camera via said camera cable, said sixth means having a plurality of conductors respectively contactable with said wires of said camera cable, some of said conductors being connected to said fifth means for feeding said fifth means with the output video signal from said television camera;
seventh means for receiving signals from said remote-control unit which has been detached from said television camera, said seventh means having a plurality of conductors connected to said fourth means for controlling the operation of said video signal recording/reproducing apparatus in response to remote-control signals from said remote control unit; and
eighth means having a plurality of conductors connected between said conductors of said seventh means and some of said conductors of said sixth means so that remote-control signals fed via said television camera cable are fed to said fourth means when said remote-control unit is attached to said television camera.

3. A video tape recording/reproducing system as claimed in claim 2, wherein said remote-control unit comprises an output cable and a plug connected to said output cable, and each of said second and seventh means comprises a connector arranged to be engaged with said plug.

4. A video tape recording/reproducing system as claimed in claim 2, wherein said remote-control unit comprises a light emitting element for emitting said remote-control signals as light rays, and each of said second and seventh means comprises a photosensitive element responsive to said light rays from said remote-control unit.

* * * * *